United States Patent
Lemke et al.

[11] Patent Number: 5,524,494
[45] Date of Patent: Jun. 11, 1996

[54] AIRCRAFT PROPELLER THRUST MEASUREMENT APPARATUS

[76] Inventors: James U. Lemke, 4251 10th Ave., San Diego, Calif. 92103; Gilbert E. Kammerer, 14064 Rue Monaco, Del Mar, Calif. 92014; Robert H. Murashige, 6546 Flamenco St., Carlsbad, Calif. 92009

[21] Appl. No.: 473,502

[22] Filed: Jun. 7, 1995

[51] Int. Cl.[6] .................................................. G01L 5/12
[52] U.S. Cl. ................................. 73/862.49; 73/117.4
[58] Field of Search ......................... 73/862.49, 117.4; 416/43

[56] References Cited

U.S. PATENT DOCUMENTS

| | | | |
|---|---|---|---|
| 954,077 | 4/1910 | Clement | 73/862.49 |
| 1,316,281 | 9/1919 | Dalton | 73/862.49 |
| 1,405,176 | 1/1922 | Zahm | 73/862.041 X |
| 1,499,861 | 7/1924 | Eaton | 73/862.041 X |
| 2,055,637 | 9/1936 | Stanley et al. | 73/117.4 |
| 2,305,771 | 12/1942 | Grupp | 73/862.49 |
| 2,367,017 | 1/1945 | Gardiner | 73/862.49 |
| 2,385,005 | 9/1945 | Langer | 73/862.29 |
| 2,516,855 | 8/1950 | Conway, Jr. | 73/862.49 |
| 2,664,746 | 1/1954 | Jacusis | 73/862.49 |
| 2,951,543 | 9/1960 | Peterson | 73/862.49 X |
| 2,986,930 | 6/1961 | Price | 73/117.4 |
| 3,469,644 | 9/1969 | Harding | 73/117.4 X |
| 3,599,480 | 8/1971 | Krieve | 73/117.4 |
| 4,328,703 | 5/1982 | McClure et al. | 73/117.4 |
| 4,787,053 | 11/1988 | Moore | 73/117.4 X |
| 4,788,855 | 12/1988 | Laskody | 73/117.4 |
| 4,833,911 | 5/1989 | Zeeban et al. | 73/117.4 |
| 5,152,169 | 10/1992 | Summerfield et al. | 73/117.4 |
| 5,170,662 | 12/1992 | Brault et al. | 73/117.4 |
| 5,235,848 | 8/1993 | Hillenbrand | 73/117.4 |

Primary Examiner—Richard Chilcot
Assistant Examiner—Elizabeth L. Dougherty
Attorney, Agent, or Firm—Daniel Robbins

[57] ABSTRACT

In present day propeller driven aircraft, the engine is mounted on slightly resilient engine mounts which in turn are secured to the aircraft fuselage. Under propeller rotation, the developed thrust causes the engine housing to move slightly forward relative to the fuselage due to the resiliency of the mounts. The amplitude of the engine displacement is directly proportional to the magnitude of the thrust, and the present invention measures this displacement and converts it to an indicated value of thrust. A displacement or force balance transducer, remote from the engine proper, is mounted behind the engine on the engine compartment firewall. A dimensionally stable compliant tensile member such as a steel cable having one end bolted to the engine housing and the other end connected to the spring loaded moveable core of the transducer transmits the engine displacement to the transducer. Securing the cable to an existing stud on the engine housing is a simple mechanical connection, and requires no modification to the engine itself.

21 Claims, 3 Drawing Sheets

AIRCRAFT PROPELLER THRUST MEASUREMENT APPARATUS

BACKGROUND OF THE INVENTION

1. Field of the Invention

This invention relates to aircraft instrumentation, and in particular to apparatus for measurement of aircraft propeller thrust.

2. Description Relative to the Prior Art

The measurement of propeller generated thrust has been of interest since the earliest days of aviation. In 1910, U.S. Pat. No. 954,077 entitled "Means for Mounting Propeller Shafts" disclosed a propeller thrust measurement system applicable to "dirigible balloons". With the development of heavier-than-air aircraft, additional thrust measuring disclosures appeared in patents issuing from 1919 on. Typical of these patents are U.S. Pat. No. 1,316,281 "Propeller-Thrust Register for Aircraft" (1919), U.S. Pat. No. 1,405,176 "Propeller Thrust and Torque Measurement" (1922), U.S. Pat. No. 2,305,771 "Means for Measuring Thrust" (1942) and U.S. Pat. No. 2,367,017 "Thrust Meter" (1945). These disclosures of the prior art generally entail coupling the measurement device onto some rotating member of the aircraft engine or onto the propeller shaft to determine axial motion relative to the engine frame of a rotating shaft under propeller thrust. This requires special mechanical hardware internally mounted in the engine or on the propeller shaft to effect the thrust measurement. Thus, the disclosed inventions of the prior art cannot be readily used for thrust measurement of a modern general aviation aircraft having a standard factory installed engine and propeller without extensive modifications to the aircraft drive system as delivered extensive modifications to the aircraft drive system as delivered from the factory. Cost and safety considerations strongly mitigate against such modifications of today's propeller driven aircraft. In U.S. Pat. No. 2,385,005 "Strain Measuring System" (1945), propeller thrust is measured by use of strain gauges on a special double ring mount that secures the engine to the aircraft frame. Again, the use of such apparatus would necessitate considerable modification to a modern, factory delivered aircraft.

SUMMARY OF THE INVENTION

Unlike thrust measuring apparatus of the prior art, practice of the present invention requires no modification to the aircraft engine or to the engine mounts, and occupies minimal space in the compartment where the measuring apparatus is located. In present day propeller driven aircraft, the engine is mounted on slightly resilient engine mounts which in turn are secured to the aircraft fuselage. Under propeller rotation, the developed thrust causes the engine housing to move slightly forward relative to the fuselage due to the resiliency of the mounts. The amplitude of the engine displacement is directly proportional to the magnitude of the thrust, and the present invention measures this displacement and converts it to an indicated value of thrust. A displacement transducer, remote from the engine proper, is mounted behind the engine on the engine compartment firewall. A compliant tensile member such as a stainless steel cable having one end bolted to the engine housing and the other end connected to the moveable core of the transducer transmits the engine displacement to the transducer. Securing the cable to an existing stud on the engine housing is a simple mechanical connection, and requires no modification to the engine itself. The electrical signal output of the transducer is processed and fed to an indicator in the cockpit which displays a digital value proportional to thrust. As is known in the art, the thrust developed by the propeller is a function of the density altitude at which the aircraft is operating, and during a calibration run a microprocessor integral to the invention normalizes the transducer signal output for maximum thrust to standard density altitude conditions (barometric reading 29.92 inches of mercury, and temperature 59 degrees, F.) All subsequent indicated thrust readings are expressed as a percentage of maximum developed thrust under standard conditions.

BRIEF DESCRIPTION OF THE DRAWINGS

The invention will be described with respect to the drawings of which.

DESCRIPTION OF THE PREFERRED EMBODIMENTS

Figure 1:
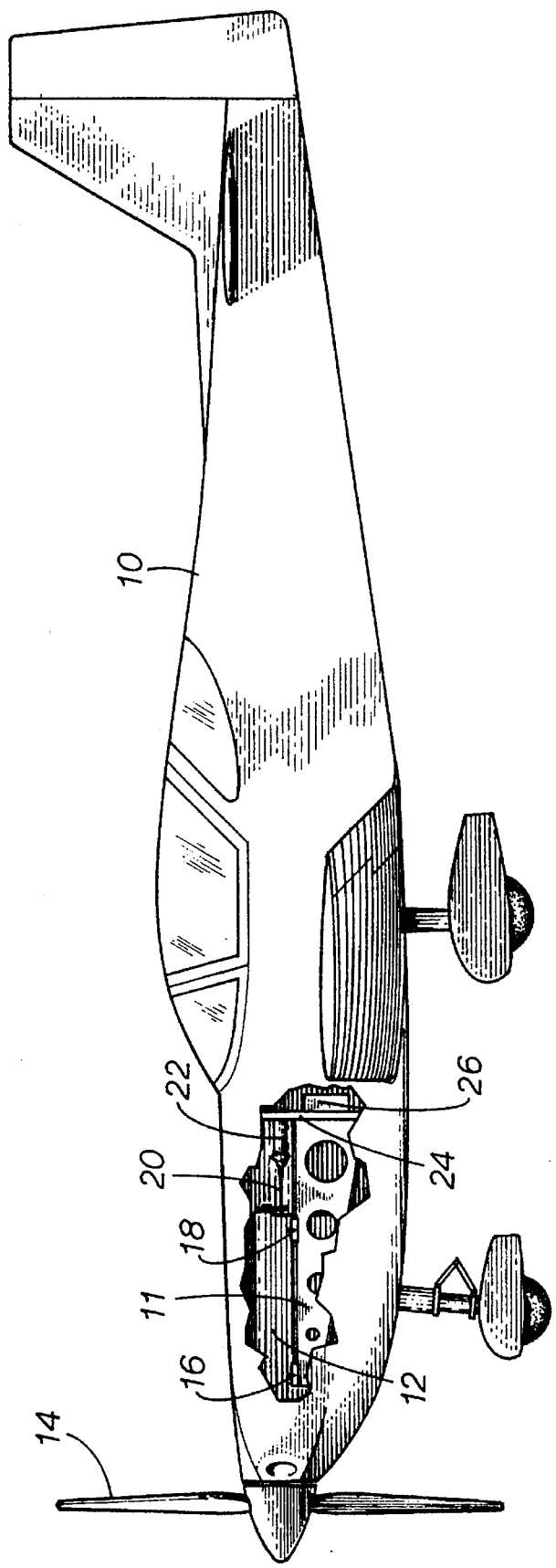
FIG. 1 is drawing of an aircraft with the invention installed.

Referring to FIG. 1, an aircraft 10 is provided with an engine 12 which drives a propeller 14. The engine 12 is mounted in the fuselage of the aircraft 10 on an engine frame 11 with resilient engine mounts 16,18 which allow a small displacement in the fore and aft directions. A complaint tensile member, for example, a stainless steel cable 20 has one end attached to the rear housing of the engine 12 and the other end to a transducer 22 mounted on the firewall 24. The transducer 22 is a linear variable differential transformer (LVDT), made by Lucas Control Systems Products, Hampton, Va., whose electrical output depends upon the position of an axially moveable core 21 (FIG. 2) located in the housing of the transducer 22, and the moveable core 21 is attached to the end of the steel cable 20. A spring (not shown) urges the core 21 to a position corresponding to the aft movement of the engine. As the propeller 14 develops thrust, the engine 12 is slightly displaced in a forward direction on the mounts 16,18 relative to the fuselage of the aircraft 10, and the motion of the steel cable axially moves the core in the transducer 22 housing by an equal amount generating an electrical signal proportional to the engine displacement. There is a substantially linear proportionality between the thrust developed by the propeller 14 and small fore and aft displacements of the engine 12 on the mounts 16,18 relative to the fuselage of the aircraft 10.

Figure 2:
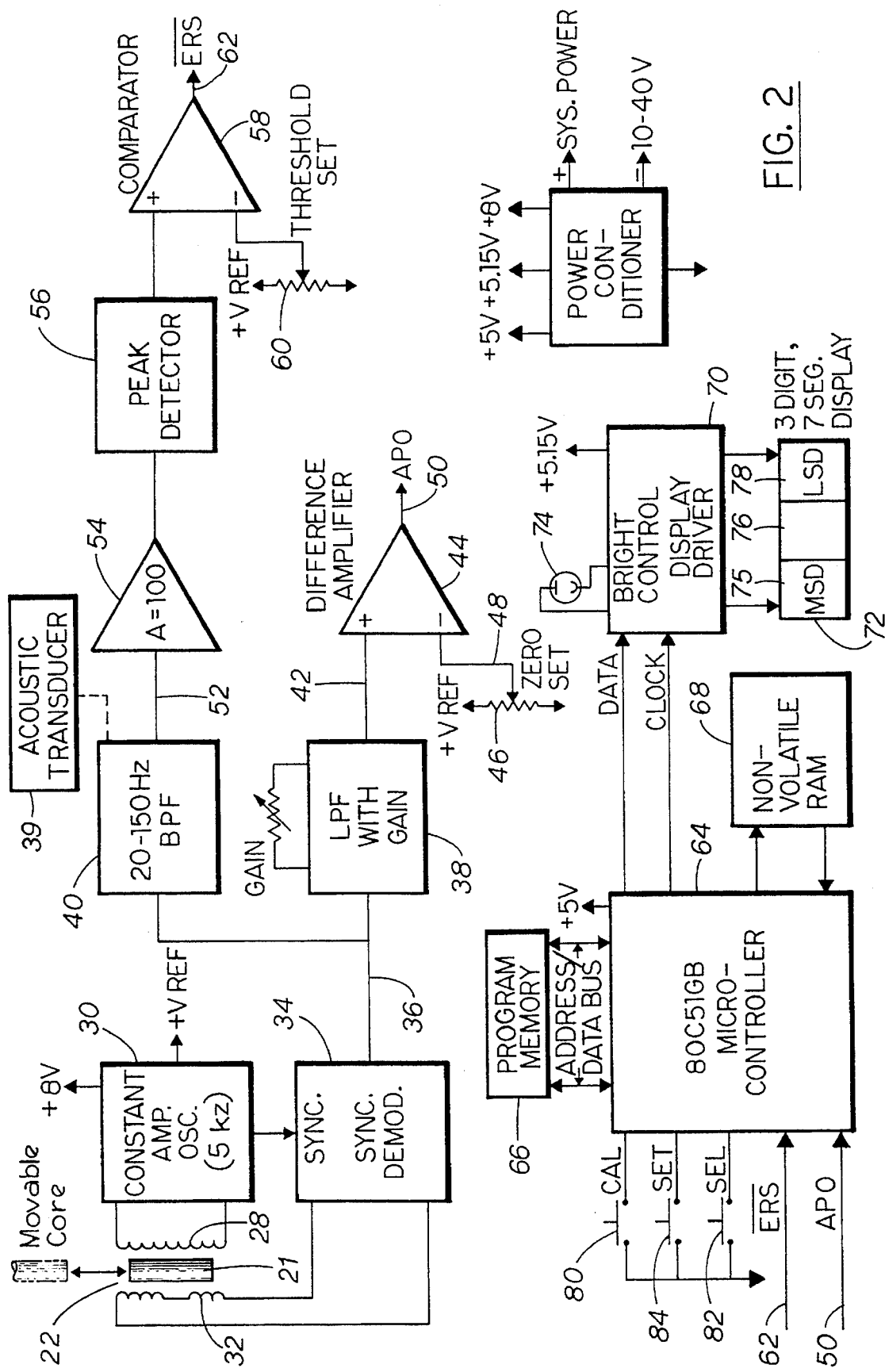
FIG. 2 is a block diagram useful in understanding the invention.

A signal processing unit provides electrical excitation to the transducer 20, and amplifies, processes and digitizes the displacement signal generated by the transducer 22, as shown in FIG. 2.

The stainless steel cable 20 positions the moveable core of the LVDT transducer 22 in response to the displacement of the engine 12 in developing thrust under operating conditions. The primary winding 28 of the LVDT transducer 22 is excited with a constant amplitude 5 kz signal from oscillator 30, and the LVDT transducer 22 output signal derived from its secondary 32 is demodulated by synchronous demodulator 34. The output signal 36 consists of a low frequency component which is the engine displacement signal due to the thrust, and a superimposed higher frequency signal due to engine vibration.

The output signal 36 is split and fed to a low pass amplifying filter 38 of bandwidth about 0–1 Hz, and a bandpass filter 40 having a bandwidth of from 20–150 Hz. The low passed displacement signal 42 feeds one input of a difference amplifier 44, whose other input is a d.c. level 48 fixed by the Zero Set potentiometer 46. The output of the difference amplifier 44 is the analog position output signal (APO) 50.

The output signal 36 is fed to the bandpass filter 40 whose band limited output signal 52 is the engine vibration component in the frequency range 20–150 Hz. The band limited output signal 52 is amplified by amplifier 54 and its peak amplitude is detected by peak detector 56. This peak amplitude is fed to one input of a comparator 58, whose other input is a Threshold Set signal established by potentiometer 60. The output of the comparator 58 is the peak amplitude signal above the set threshold level, and is the engine run signal 62 (ERS). Alternately, an acoustic transducer 39 mounted to the electronic box 26 and responsive to engine vibration may be used instead of signal line 36 to create the ERS signal.

The APO signal 50 is an analog signal input to a type 80C51GB Microcontroller 64 manufactured by Intel Corporation, Santa Clara Calif. The microcontroller contains an 8 bit CPU and on chip peripherals including an A/D converter. The APO signal 50 is digitized by the microcontroller 64 under control of program steps stored in program memory 66, and the digital value of the APO 50 is stored in RAM memory 68. The digital APO value, proportional to measured thrust, is used to calculate a ratio expression measuring thrust as a percentage of maximum developed thrust, in a manner that will be explained below. This percentage data is fed to a display driver 70, and displayed as two digits on a liquid crystal display 72 mounted in the cockpit. A photocell 74, mounted in the instrument panel adjacent to the display 72, controls the brightness of the display 72 as a function of the illumination level in the cockpit.

Figure 3:
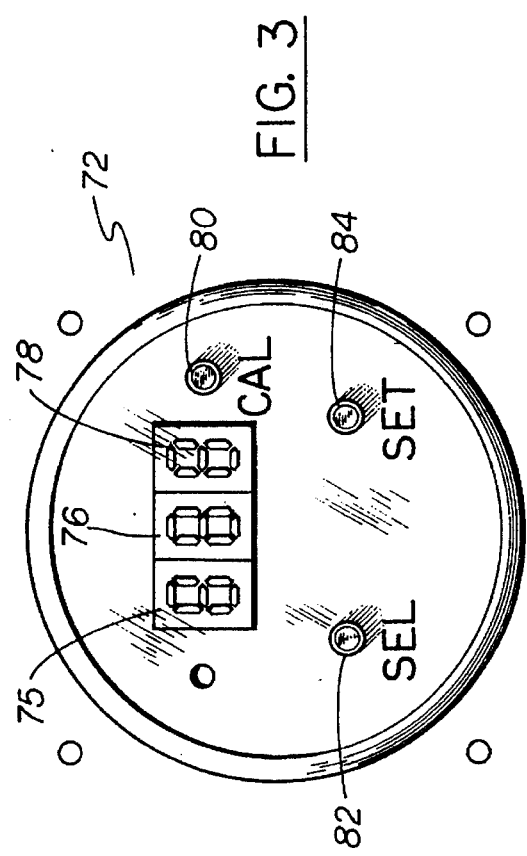
FIG. 3 is a drawing of the display employed in the invention.

The display 72, mounted in the instrument panel, is shown in FIG. 3. It contains three digit positions, 74,76,78 Cal button 80, a Sel button 82 and a Set button 84, whose use will be described below. An alternative display is an elongated package that mounts on the glare shield of the instrument panel.

Calibration Procedure

Figure 4:
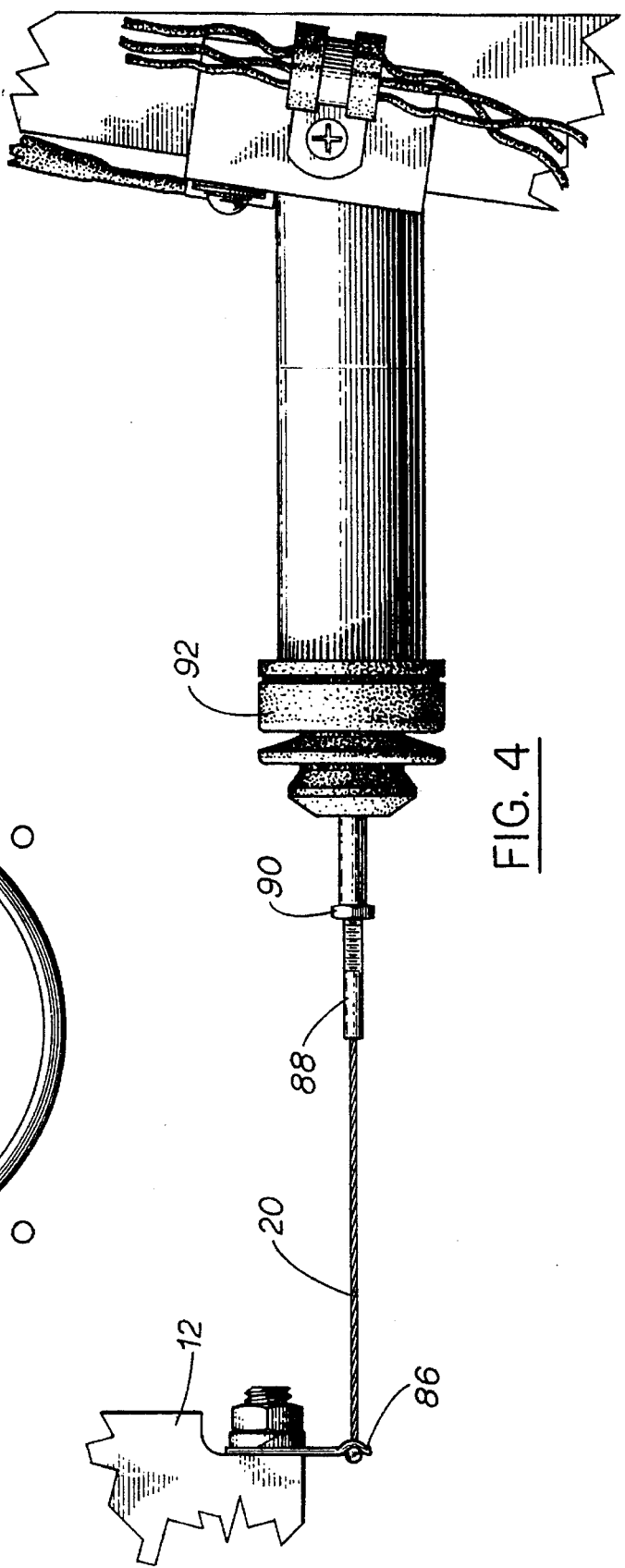
FIG. 4 is a drawing showing the connection of the transducer to the aircraft engine.

In the calibration procedure, a mechanical zero adjustment of the transducer 22 must first be made. Referring to FIG. 4, the steel cable 20 is attached to the engine 12 by means of a fitting 86 which allows the cable 20 to rotate about its longitudinal axis. Attached to the cable 20 is a threaded extender 88 and lock nut 90. The extender 88 runs through a rubber boot 92 and threads into the core 21 (FIG. 2) of the transducer 22 whose "zero" signal output occurs when the core 21 is centered in the transducer 22 housing. The pilot performing the calibration turns the electrical power "on", and without starting and running the engine, power is supplied to the thrust measuring apparatus. The pilot loosens the lock nut 90 and the rotates the cable 20 by hand until the display 72 reads as close to "zero" as practical. This reading is the "cold zero" value which holds as the pilot tightens the lock nut 90. The Cal button 80 is then depressed, storing the "cold zero" value in the memory 68 of the microcontroller 64.

After setting the mechanical zero of the transducer 22, the pilot calculates the density altitude for conditions at the field where the calibration run is being performed. This calculation of density altitude makes use of the local pressure altitude and temperature in a manner well known in the aviation art. The density altitude value is input into the system by means of the display 72 by alternately pressing the Sel button 82 to select the proper digit position in the display, and then repeatedly pressing the Set button 84 until the appropriate density altitude digit appears in the selected digit position. When the correct density altitude is displayed, the Cal button 80 is pressed entering the density altitude data into the microcontroller 64.

The next step is calibration of the engine/propeller for maximum thrust. The pilot starts the engine, taxies to the run up area, locks the brakes and applies maximum power. The mixture is adjusted for maximum thrust display reading. As previously described above, during the run up the developed thrust displaces the engine 12 on the mounts 16, 18 and resultant maximum thrust displacement APO signal 50 is fed to the microcontroller 64. As stated previously, the maximum thrust value must be corrected for variations due to density altitude to establish a baseline maximum thrust value. Because of the decrease in the density of air with increasing density altitude, less thrust is developed under increasing density altitude than for the same engine run conditions under standard atmospheric conditions (barometric pressure 29.92" Hg, and 59 degrees F.). To correct the maximum thrust to standard atmospheric conditions, a table of correction factors as a function of density altitude is stored in the RAM 68. This table is generated from the adiabatic pressure/altitude variation relationship $p/p_0 = e^{-0.000039 \times A}$, where $p/p_0$ is the ratio of pressure relative to the standard atmosphere, when the density altitude A is expressed in feet. The value of the maximum thrust developed during the calibration run is fed to the microcontroller as an $(APO)_{max}$ signal where it is divided by the $(p/p_0)$ value appropriate for the density altitude previously entered by the pilot. By correcting the maximum thrust for density altitude at the time and place of calibration, a maximum thrust value baseline is established against which subsequent inflight thrust measurements are made for comparison. This digital value of the maximum thrust corrected for density altitude is designated as RA, and is stored in the memory 68.

The pilot then reduces the engine throttle to idle or taxies to the parking area, and shuts down the engine, leaving the electrical power "on". At this time the engine compartment is warm; the engine just having been run at full throttle for a period of time. The heating of the engine compartment results in differential heating of elements of the thrust measurement system, such as the cable 20, and transducer 22 housing, with the result of a thermal drift of the mechanically set zero signal value. Correction of the drift is then automatically initiated to compensate for this change in the zero.

It will be recalled that an engine run signal ERS 62 was developed as described above and as shown in FIG. 2. The ERS signal is only present while the engine 12 is running, so that the drop of the ERS signal line is indicative that the engine 12 was running but is now turned off, which means that the engine compartment has now thermally warmed up, and may be described as "hot". The ERS signal 62 is fed to the microcontroller 64, and the drop of this signal line initiates a remeasurement of the zero, i.e. a "hot" zero, by digitizing and storing the APO signal 50 at this time. This measurement of the "hot" zero is made every time after the engine is run, and an average of the new "hot" zero and the previously stored zero updates the stored "hot" zero. This new value is used during thrust measurement in flight.

Operational Thrust Measurement

While operating on the ground or during flight, the developed thrust is continuously monitored. After calibration as described above, the maximum thrust value RA and the "hot" zero value, $\text{Zero}_{hot}$, are available from storage in the RAM 68. During operations, the value of the APO signal 50 is continually fed to the microcontroller 64, and is proportional to the thrust being developed. Under program control from the program memory 66, the following calculation is repetitively performed by the microcontroller 64 during flight operations:

$$\%T = ([(APO)-(\text{Zero})_{hot}]/R\Delta) \times 100$$

The %T value is therefore the current measured thrust expressed as a percentage of the baseline maximum thrust. The calculated %T values are fed to the display 72 and are continually updated. During cruise, the pilot may press the Sel 82 button which then stores the current cruise value of thrust. If the thrust varies by more than ±10% from the set cruise value, the display 72 will flash, alerting the pilot to the change.

The thrust measurement system is especially suitable for use on conventional twin propeller driven aircraft. A twin installation consists of two complete systems, one for each engine as described above with the outputs being fed to two displays. Because the transducer 22 is responsive to both positive and negative displacements of the engine position, loss of power of one engine resulting in windmilling of the propeller is communicated to the pilot as a negative thrust reading on the corresponding display.

The system may also be installed without modification on aircraft such as the Cessna Skymaster which utilize a pusher engine. In this case, the engine displacement is opposite to that of a standard propeller/engine combination, and the thrust for the pusher engine is read as a negative thrust.

Because the thrust measurement is developed as a percentage of maximum thrust, a standard measurement system is applicable to a wide variety of propeller driven aircraft without modification as operation is independent of the actual level of thrust.

The invention has been described in detail with particular reference to preferred embodiments thereof, but it will be understood that variations and modifications can be effected within the spirit and scope of the invention. For example, one of a variety of remotely located transducers may be used to measure engine displacement, such as a potentiometer transducer, an infra-red or optical displacement transducer, or force balance transducer.

What is claimed is:

1. A thrust measurement system for use with engine driven propeller aircraft, said thrust measurement system comprising:
   a) displacement measuring means for installation in said aircraft, said displacement measuring means for direct attachment to the air frame of said aircraft at a location remote from said engine, and
   b) means for transmitting the magnitude of the longitudinal displacement of said engine relative to said airframe to said displacement measuring means.

2. The thrust measurement system of claim 1 wherein said displacement measuring means comprises a linear motion to electrical output transducer.

3. The thrust measurement system of claim 2 wherein said linear motion to electrical output transducer is a linear variable differential transformer transducer having a moveable core therein.

4. The thrust measurement system of claim 3 wherein said means for transmitting the magnitude of the longitudinal displacement of said engine is a metallic cable from said engine to said moveable core.

5. An engine driven propeller aircraft thrust measuring system, said system comprising:
   a) displacement measuring means for installation in said aircraft, said displacement measuring means for direct attachment to the air frame of said aircraft at a location remote from said engine,
   b) means for transmitting the magnitude of the longitudinal displacement of said engine relative to said airframe to said displacement measuring means,
   c) means for generating digital data corresponding to said displacement measuring means,
   d) means for processing the digital data derived from the maximum thrust value produced by said engine during a first engine run,
   e) means for manually inputting digital density altitude data into said system,
   f) means for providing a density altitude correction from said density altitude data to said maximum thrust value to provide a baseline maximum thrust value, and
   g) means for displaying the thrust value provided by said engine during a second engine run as a percentage of said baseline maximum thrust value.

6. The thrust measurement system of claim 5 wherein said displacement measuring means comprises a linear motion to electrical output transducer.

7. The thrust measurement system of claim 6 wherein said linear motion to electrical output transducer is a linear variable differential transformer transducer having a moveable core therein.

8. The thrust measurement system of claim 7 wherein said means for transmitting the magnitude of the longitudinal displacement of said engine is a metallic cable from said engine to said moveable core.

9. The thrust measurement system of claim 5 wherein said means for generating digital data is an analog to digital converter.

10. The thrust measurement system of claim 5 wherein said means for processing digital data is a digital computer.

11. The thrust measurement system of claim 5 wherein said means for inputting digital data comprises push buttons incorporated into said means for displaying said thrust value.

12. The thrust measurement system of claim 5 wherein said means for displaying said percentage is a liquid crystal display.

13. An engine driven propeller aircraft thrust measuring system, said system comprising:
   a) displacement measuring means for installation in said aircraft, said displacement measuring means for direct attachment to the air frame of said aircraft at a location remote from said engine,
   b) means for transmitting the magnitude of the longitudinal displacement of said engine relative to said airframe to said displacement measuring means,
   c) means for generating digital data corresponding to said displacement measuring means,
   d) means for processing the digital data derived from the maximum thrust value produced by said engine during a first engine run, e) means for manually inputting digital density altitude data into said system, f) means for providing a density altitude correction from said density altitude data to said maximum thrust value to provide a baseline maximum thrust value, and g) means for displaying the thrust value provided by said engine during a second engine run as a percentage of said baseline maximum thrust value, h) means for signalling an engine shutdown after an engine run, and i) means for correcting temperature drift of said displacement measurement means by use of said means for signalling an engine shutdown.

14. The thrust measurement system of claim 13 wherein said displacement measuring means comprises a linear motion to electrical output transducer.

15. The thrust measurement system of claim 14 wherein said linear motion to electrical output transducer is a linear variable differential transformer transducer having a moveable core therein.

16. The thrust measurement system of claim 15 wherein said means for transmitting the magnitude of the longitudinal displacement of said engine is a compliant tensile member from said engine to said moveable core.

17. The thrust measurement system of claim 13 wherein said means for generating digital data is an analog to digital converter.

18. The thrust measurement system of claim 13 wherein said means for processing digital data is a digital computer.

19. The thrust measurement system of claim 13 wherein said means for inputting digital data comprises push buttons incorporated into said means for displaying said thrust value.

20. The thrust measurement system of claim 13 wherein said means for displaying said percentage is a liquid crystal display.

21. A method of measuring the thrust of a engine driven propeller aircraft, said method comprising the steps of:

a) measuring the longitudinal displacement of said engine relative to the frame of said aircraft, b) converting said displacement measurement to an electrical signal, c) determining from a first electrical signal the maximum thrust value provided by said engine during a first engine run, d) correcting said maximum thrust value for density altitude related to said first engine run, e) determining from a second electrical signal the operating thrust value provided by said engine during a second engine run, f) calculating the ratio of said second electrical signal to said first electrical signal, g) displaying said ratio to express said operating thrust value as a percentage of said maximum thrust value.

g) displaying said ratio to provide the percent of said maximum thrust value.

* * * * *